United States Patent
Krymski

(10) Patent No.: US 6,917,027 B2
(45) Date of Patent: Jul. 12, 2005

(54) METHOD AND APPARATUS FOR REDUCING KTC NOISE IN AN ACTIVE PIXEL SENSOR (APS) DEVICE

(75) Inventor: Alexander I. Krymski, Montrose, CA (US)

(73) Assignee: Micron Technology Inc., Boise, ID (US)

( * ) Notice: Subject to any disclaimer, the term of this patent is extended or adjusted under 35 U.S.C. 154(b) by 0 days.

(21) Appl. No.: 10/117,791

(22) Filed: Apr. 4, 2002

(65) Prior Publication Data

US 2002/0175269 A1 Nov. 28, 2002

Related U.S. Application Data

(60) Provisional application No. 60/281,603, filed on Apr. 4, 2001.

(51) Int. Cl.[7] ................................ H01L 27/00
(52) U.S. Cl. .................. 250/208.1; 348/308; 257/292
(58) Field of Search .................... 250/208.1, 214.1, 250/214 C; 348/308, 309, 302, 241, 294; 257/292, 291, 290, 288, 431, 443, E27.133, E27.132

(56) References Cited

U.S. PATENT DOCUMENTS

| | | | | |
|---|---|---|---|---|
| 5,841,126 A | * | 11/1998 | Fossum et al. | 250/208.1 |
| 6,133,862 A | * | 10/2000 | Dhuse et al. | 341/118 |
| 6,320,617 B1 | * | 11/2001 | Gee et al. | 348/302 |
| 2002/0080263 A1 | * | 6/2002 | Krymski | 348/364 |

* cited by examiner

*Primary Examiner*—Thanh X. Luu
*Assistant Examiner*—Seung C. Sohn
(74) *Attorney, Agent, or Firm*—Dickstein Shapiro Morin & Oshinsky LLP

(57) ABSTRACT

An image sensing device, such as a CMOS Active Pixel Sensor (APS) device, includes an array of pixels. Each pixel includes a reset transistor connected between a photodetector and a supply voltage. In a readout operation, a signal integrated onto the photodetector is sampled onto a holding capacitor. The photodetector is then reset in a reference reset operation during which the photodetector is clamped to the supply voltage. A reset signal is sampled from the pixel while the photodetector is clamped to the supply voltage. Reset, or kTC, noise in the reset signal may be filtered by a source-follower transistor in the pixel.

21 Claims, 5 Drawing Sheets

METHOD AND APPARATUS FOR REDUCING KTC NOISE IN AN ACTIVE PIXEL SENSOR (APS) DEVICE

CROSS-REFERENCE TO RELATED APPLICATION

This application claims priority to U.S. Provisional Application Ser. No. 60/281,603 filed on Apr. 4, 2001.

BACKGROUND

Active pixel sensor (APS) imaging devices are described in U.S. Pat. No. 5,471,515. These imaging devices include an array of pixel cells, arranged in rows and columns, that convert light energy into electric signals. Each pixel includes a photodetector and one or more active transistors. The transistors typically provide amplification, readout control and reset control, in addition to producing the electric signal output from the cell.

APS devices can be operated in a double-sampling mode, in which both a signal voltage and a reset voltage are sampled during pixel readout. The difference between the signal and reset voltages determines the brightness of the pixel. The dominant source of noise in conventional APS is photodetector kTC noise, or reset noise, where k is Boltzmann's constant, T is the absolute temperature, and C is the junction's parasitic capacitance. The kTC noise is the thermal noise resulting from the reset after each pixel's readout. The noise is contributed twice, one with the signal, i.e., the kTC noise from the previous reset, and a second time with reference reset, which follows signal read.

SUMMARY

An image sensing device, such as a CMOS Active Pixel Sensor (APS) device, includes an array of pixels. Each pixel includes a reset transistor connected between a photodetector and a supply voltage. In a readout operation, a signal integrated onto the photodetector is sampled onto a holding capacitor. The photodetector is then reset in a reference reset operation during which the photodetector is clamped to the supply voltage. A reset signal is sampled from the pixel while the photodetector is clamped to the supply voltage. Reset, or kTC, noise in the reset signal may be filtered by a source-follower transistor in the pixel.

The image sensing device may be a rolling shutter APS device. The supply voltage may be decreased by the threshold voltage of the reset transistor while the reset signal is being sampled. Alternatively, the voltage applied to the gate of the reset transistor may be boosted while the reset signal is being sampled.

The image sensing device may be a freeze-frame APS device. A memory capacitor may be reset by clamping the memory capacitor to a reset supply voltage. The reset signal may be sampled while the memory capacitor is clamped to the reset supply voltage.

DETAILED DESCRIPTION

Figure 1:
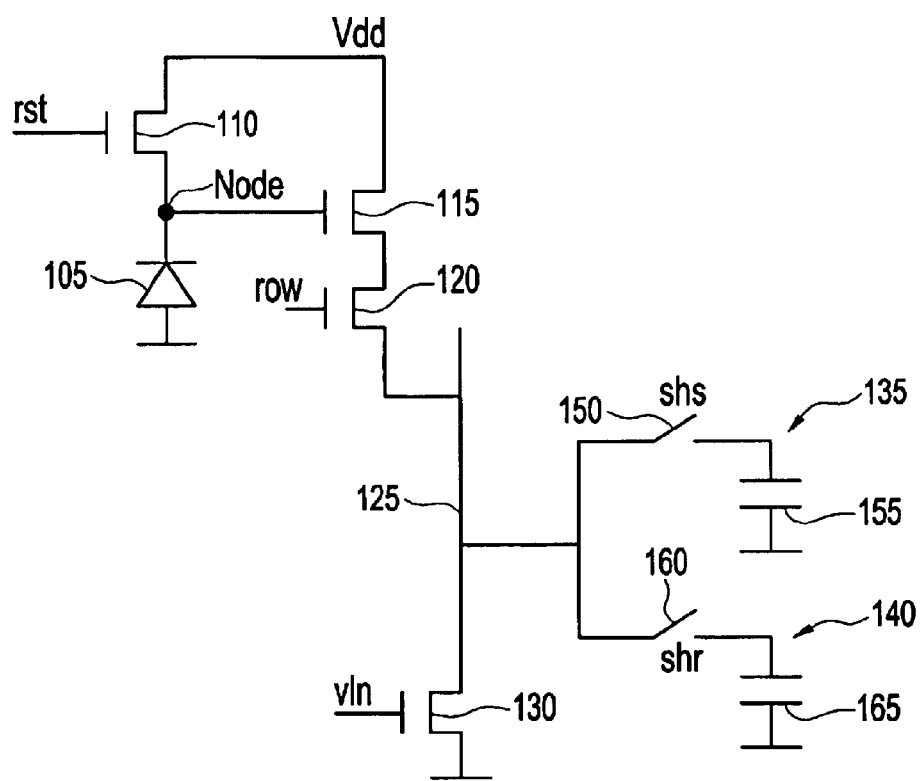
FIG. 1 is a schematic diagram of a rolling shutter Active Pixel Sensor (APS) pixel according to an embodiment.
Figure 7:
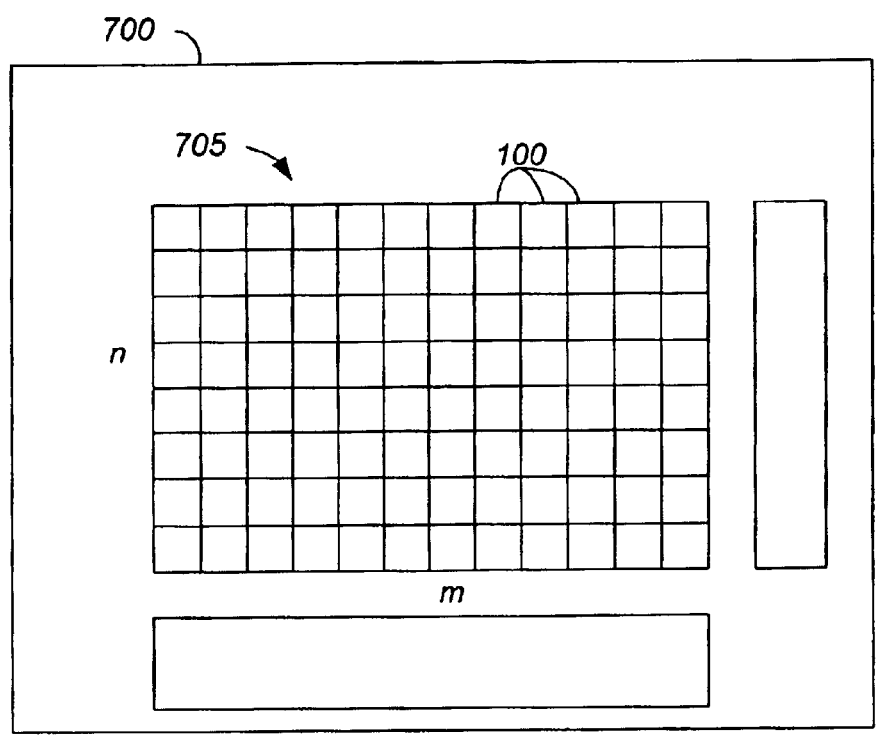
FIG. 7 is block diagram of an APS device according to an embodiment.

FIG. 1 illustrates an exemplary pixel 100 for an Active Pixel Sensor (APS) device 700 (shown in FIG. 7). The APS device may include an array 705 of independently addressable pixels arranged in n rows and m columns. The pixel 100 may include a photodetector 105, such as a photodiode, a reset transistor 110, a source-follower transistor 115, and a row select transistor 120. The reset transistor 110 and the source-follower transistor 115 are connected to a supply voltage, $V_{dd}$. An APS device including this type of three transistor pixel may be referred to as a rolling shutter, or 3T, APS device.

Pixels in each row are connected to a column 125. The bottom of each column of pixels has a load transistor 130 at a voltage $V_{ln}$, a signal branch 135 to store the signal level for readout, a reset branch 140 to store the reset level for readout.

The signal branch 135 has a signal sample and hold (SH) element. This may include a signal sampling switch 150 and a signal holding capacitor 155. The reset branch 140 also includes a S/H element with a reset sampling switch 160 and a reset holding capacitor 165.

The photodetector 105 converts light energy received in the form of photons into an electrical charge. That charge corresponds to the amount of light the pixel receives prior to a readout function. Pixels in the array may be read out row-by-row. Readout of the pixel 100 may occur in three stages: an image integration stage; a signal readout stage; and a reset stage.

Prior to readout, the voltage on photodetector 105 is reset to a reset voltage R. This may be referred to as real reset. Reset voltage R may be about 3 volts. After the pixel has been selected for readout, this voltage is integrated and decreases in response to incident light.

During the integration stage, light energy in the form of photons strikes photodetector 105. Ideally each photon creates an electron-hole pair in the photodetector. Photodetector 105 may be designed to limit recombination between the newly formed electron-hole pairs. As a result, the photogenerated holes and electrons migrate during the integration stage. The photogenerated holes are attracted to the ground terminal of the photodetector, and the photogenerated electrons are attracted to the positive terminal of the photodetector. Each additional electron attracted to the positive terminal of photodetector 105 reduces the voltage on the photodetector from the reset value R. The integration stage may take about 1 msec.

During the signal readout stage, the resultant signal voltage S on photodetector 105 is sampled onto signal branch 135. In a fully integrated pixel, corresponding to a brightest pixel in the image, the signal voltage S may be about 1.5 volts.

During the reset stage, the value of the photodetector is reset to reset voltage R and this value is sampled onto the reset branch 140. The reset operation may take about 1 msec.

Figure 2:
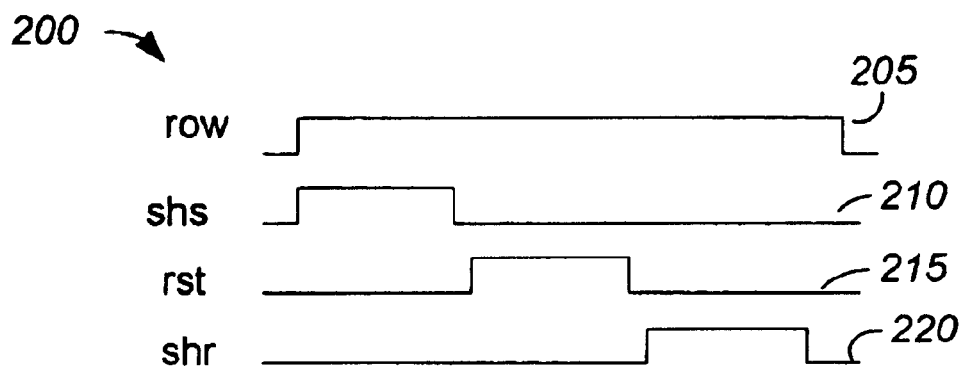
FIG. 2 is a timing diagram illustrating a sampling sequence for a rolling pixel shutter APS pixel.

FIG. 2 is a timing diagram illustrating a sampling sequence 200 for the pixel 100. When the row is selected, the row select signal 205 is asserted. The row select transistor is turned on, opening a path to the column 125. The signal voltage S on the photodetector 105 from the integration stage is sampled onto signal capacitor 155 while a signal (shs) 210 is asserted. The photodetector 105 is reset by applying a rst voltage 215 to the gate of the reset transistor 110 to sample the supply voltage ($V_{dd}$) onto the photodetector 105. This reset may be referred to as the reference reset. Next, the reset level on the photodetector 105 is sampled onto the signal capacitor 165 while a signal (shr) 220 is asserted. The photodetector 105 is then reset for the next readout operation. Real reset is then performed to reset the photodetector 105 for the next readout operation.

Reset, or kTC, noise may be a significant source of noise in a CMOS (Complementary Metal-Oxide Semiconductor) APS device. In the sampling sequence 200, kTC noise is contributed twice; once with the signal sampled, with kTC noise from the previous real reset, and a second time with the reference reset.

The photodetector 105 may be reset with a hard reset or a soft reset. In a hard reset, the photodetector is charged to the supply voltage ($V_{dd}$). In a soft reset, the drain and gate of the reset transistor are kept at the same potential, causing the photodetector to be reset using sub-threshold MOSFET current. In soft reset, the photodetector is not fully reset to the supply voltage ($V_{dd}$).

Both hard reset and soft reset have advantages and disadvantages. Soft reset advantageously results in low-noise output and a high power-supply rejection ratio (PSRR). However, disadvantageously, soft reset results in image lag of as much as 70 percent of the mean signal in the previous frame, and a markedly nonlinear response under low illumination. Hard reset advantageously eliminates image lag but disadvantageously results in increased read noise, dark current, and reduced power-supply ratio.

If a hard reset is used in the sampling sequence 200, then the total noise from two reset operations is:

$<Q_n^2> = 2\ kTC$; $<V_n^2> = 2\ kT/C$ or $35e^-/1.4$ mV for 4 fF capacitance.

If a soft reset or the combination of hard-soft resets (pixel flush) are used, then $<Q_n^2> = kTC$; $<V_n^2> = kT/C$ or $25e^-/1.0$ mV for 4 fF capacitance.

Figure 3:
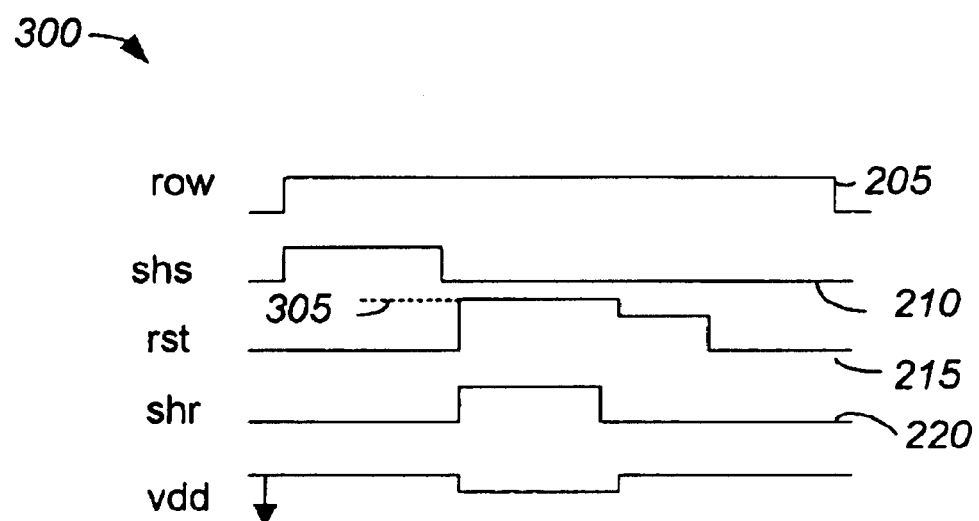
FIG. 3 is a timing diagram illustrating a sampling sequence for a rolling pixel shutter APS pixel with reduced kTC noise according to an embodiment.

FIG. 3 is a sampling sequence 300 for the pixel 100 which may reduce the noise contribution from the reference reset. When the pixel's row is selected, the row select signal 205 is asserted, opening a path to the column 125. The signal on the photodetector 105 from the integration stage is sampled onto signal holding capacitor 155. Reference reset is performed by sampling the supply voltage ($V_{dd}$) onto the photodetector 105. The shr signal 220 is asserted while the rst voltage is high such that the reset signal is sampled during the reference reset rather than after the reference reset. With both the reset transistor 110 and the reset sampling switch 160 closed, the reset holding capacitor 165 is connected to a constant voltage, i.e., supply voltage ($V_{dd}$). The kTC noise is filtered by the source-follower transistor 115, which may have a low bandwidth and serves as a buffer. Because the kTC noise has a very high frequency, e.g., on the order of GHz or higher, the kTC noise may not pass through the source-follower transistor 115. This reduces or eliminates the kTC noise contribution from the reference reset, reducing the overall kTC noise by up to a factor of $\sqrt{2}$. For example, if a soft reset is used for real reset before the integration stage, the kTC noise may be reduced from $25e^-$, or 1 mV, to $18e^-$, or 0.73 mV.

To place the reset transistor 110 into the linear mode, the rst voltage 215 may be boosted above its regular value 305 and, after sampling the reset value, returned to its regular value. Alternatively, the supply voltage ($V_{dd}$) may be clamped to a level sufficient to place the reset transistor 110 in a linear mode. Reducing $V_{dd}$ by the threshold voltage of the rest transistor ($V_{th\ rst}$) may compensate for a temperature drift which may be associated with hard reset. The reset transistor 110 may also be placed in linear mode by simultaneously boosting the rst voltage 215 and decreasing $V_{dd}$, as shown in FIG. 3.

The sampling sequence 300 may result in higher Fixed Pattern Noise (FPN) and source-follower offset variations.

Figure 4:
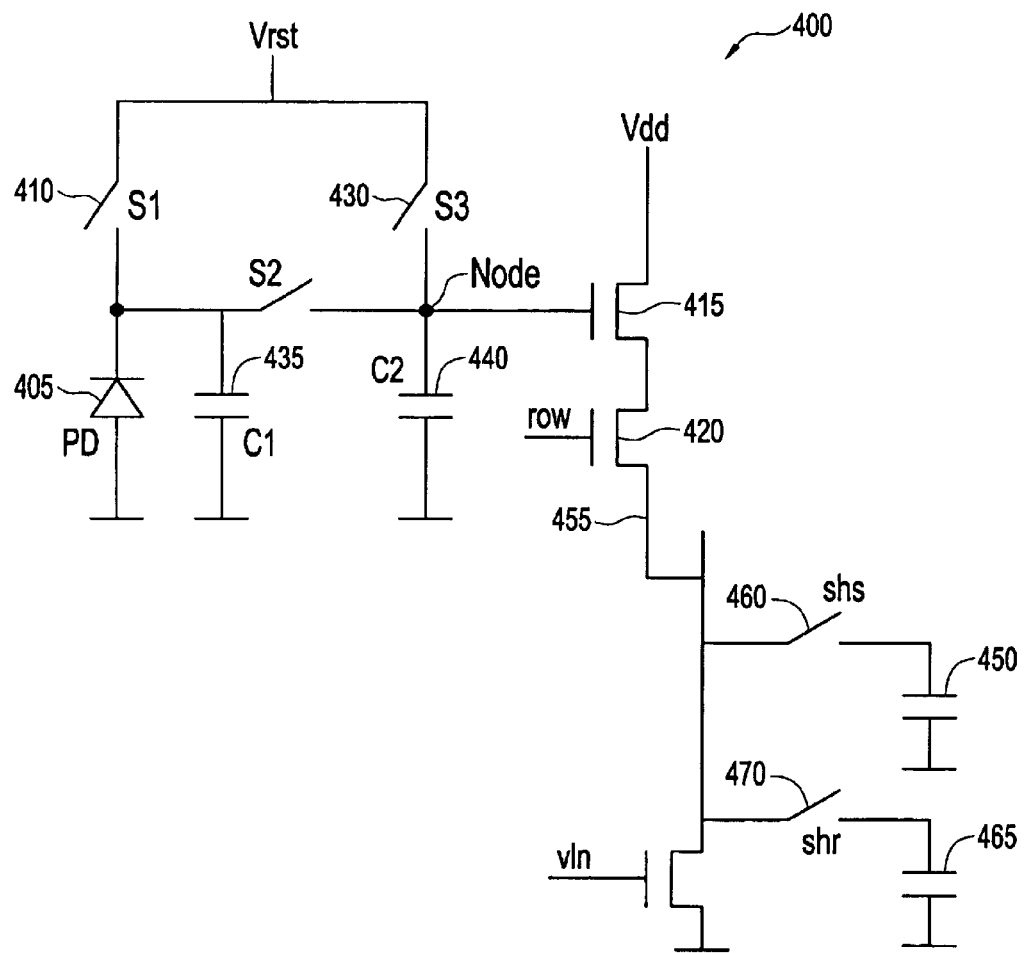
FIG. 4 is a schematic diagram of a freeze-frame shutter APS pixel according to an embodiment.

FIG. 4 illustrates an exemplary pixel 400 for an Active Pixel Sensor (APS). The pixel 400 may include a photodetector 405, a reset switch (S1) 425, a source-follower transistor 415, a row select transistor 420, a switch (S2), a switch (S3) 430, a capacitor (C1) 435 and a capacitor (C2) 440. An APS device including this type of give transistor pixel may be referred to as a freeze-frame shutter APS device.

Figure 5:
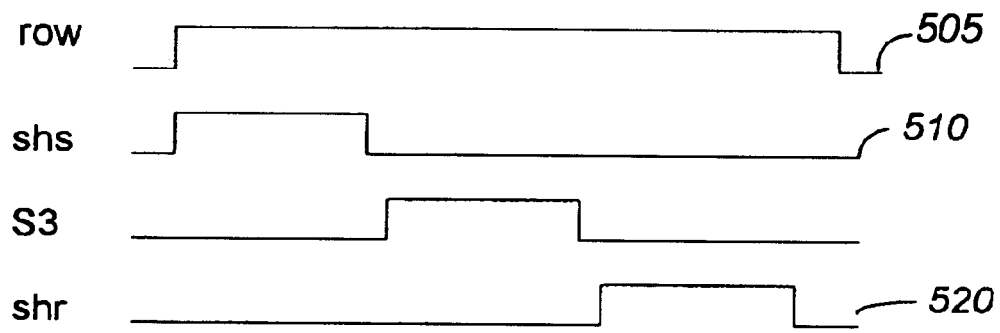
FIG. 5 is a timing diagram illustrating a sampling sequence for a freeze-frame APS pixel.

FIG. 5 is a timing diagram illustrating a sampling sequence 500 for the pixel 400. In a freeze-frame shutter APS device, photodetectors in the entire pixel array may be reset simultaneously through reset switches S1. After integration is completed, the signal voltage S is sampled onto capacitor C2, which serves as a memory, through switch S2. To read the signal voltage, the row is enabled by asserting row enable signal 505. The signal is sampled onto a signal holding capacitor 450 via column 455 and signal sampling switch 460 while an shs signal 510 is asserted. Switch S3 is closed and opened to reset the memory capacitor C2. Next, the reset value from the memory capacitor is sampled onto a reset holding capacitor 465 via column 455 and a reset sampling switch 470 while an shr signal 520 is asserted.

Sources of noise in the sampling sequence 500 include kTC noise from reset of the photodetector 405, kTC noise (kTC1) introduced when the memory capacitor C2 is emptied prior to receiving the signal voltage, charge redistribution noise after the switch S2 enable-disable operation, kTC noise (kTC) introduced when take a reference reset sampling prior to sampling the reset voltage onto reset holding capacitor 465.

Figure 6:
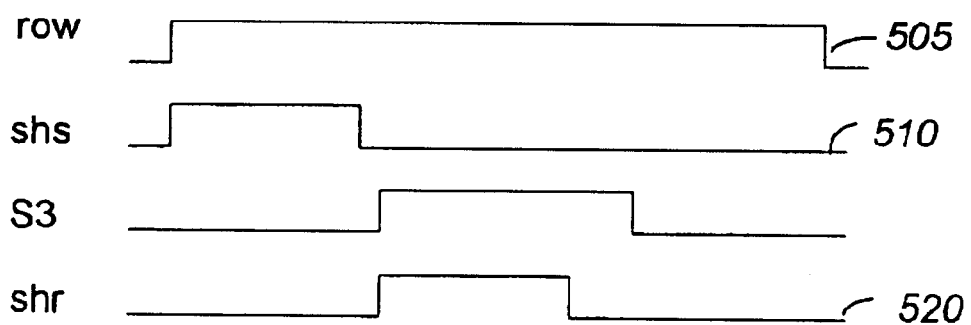
FIG. 6 is a timing diagram illustrating a sampling sequence for a freeze-frame pixel according to another embodiment.

FIG. 6 is a sampling sequence 600 for the pixel 400 which may reduce the noise contribution from the reference reset. Rather than taking the reset sample after reference reset is completed, the sample is taken while the memory capacitor C2 is clamped to $V_{rst}$. The kTC noise will be cancelled provided the bandwidth of the kTC noise is higher than the source-follower 415 bandwidth. This may be achieved when the reset switch is in linear mode because pixel capacitance may be orders less than the column readout stray capacitance. PMOS switches may be used in the freeze-frame shutter APS pixel 400, which can operate in linear mode without altering $V_{rst}$ or $V_{dd}$.

The sampling sequence 600 may slightly increase pixel FPN because the symmetry between the reset of photodiode and the reset of memory is broken.

A number of embodiments have been described. Nevertheless, it will be understood that various modifications may be made without departing from the spirit and scope of the invention. Accordingly, other embodiments are within the scope of the following claims.

What is claimed is:

1. An apparatus comprising:
   a sensor including a plurality of pixels arranged in an array, each pixel including:

a photodetector;

a node, adapted for providing a supply voltage;

a reset transistor connected between the photodetector and the supply voltage node;

a sampling branch operative to sample a reset signal from the pixel; and a readout controller operative to perform a reference reset operation by asserting a reset signal on a gate of the reset transistor at a voltage greater than a reference voltage, wherein the reference voltage is a minimum voltage which causes the reset transistor to conduct and clamp the pixel to the supply voltage, and to control the sampling branch to sample the reset signal during the reference reset operation.

2. The apparatus of claim 1, further comprising a source-follower transistor in the pixel operative to filter high frequency kTC noise from the reset signal.

3. The apparatus of claim 1, wherein the sensor comprises an Active Pixel Sensor (APS) device.

4. The apparatus of claim 1, wherein the sensor comprises a rolling shutter sensor, and wherein the pixel is a three transistor (3T) pixel.

5. An apparatus comprising:

a rolling shutter sensor comprising a plurality of three transistor (3T) pixels arranged in an array, each pixel including:

a photodetector;

a node, adapted for providing a supply voltage;

a reset transistor connected between the photodetector and the supply voltage node;

a sampling branch operative to sample a reset signal from the pixel; and a readout controller, wherein said readout controller is operative to perform a reference reset operation by asserting a reset signal on a gate of the reset transistor at a voltage greater than a minimum voltage which causes the reset transistor to conduct and clamp the pixel to the supply voltage, to control the sampling branch to sample the reset signal during the reference reset operation, and to decrease the supply voltage by a threshold voltage of the reset transistor while the reset signal is being sampled.

6. An apparatus comprising:

a freeze-frame shutter sensor including a plurality of five transistor (5T) pixels arranged in an array, each pixel including:

a photodetector;

a node, adapted for providing a supply voltage;

a reset transistor connected between the photodetector and the supply voltage node;

a sampling branch operative to sample a reset signal from the pixel; and a readout controller operative to perform a reference reset operation by asserting a reset signal on a gate of the reset transistor at a voltage greater than a minimum voltage which causes the reset transistor to conduct and clamp the pixel to the supply voltage, and to control the sampling branch to sample the reset signal during the reference reset operation.

7. A method comprising:

resetting a sensing node in a pixel by asserting a reset signal at a gate of a reset transistor at a level higher than a reference voltage, wherein the reference voltage is a minimum voltage which causes the reset transistor to conduct and clamp the sensing node to a supply voltage; and sampling a reset value while the reset signal is asserted and the sensing node is clamped to the supply voltage.

8. The method of claim 7, wherein said resetting the sensing node comprises resetting a photodetector in a rolling shutter Active Pixel Sensor (APS) device.

9. The method of claim 7, wherein said sampling comprises sampling the reset value in a double-sampling readout operation.

10. A method of claim 7, wherein said sampling is response to a sample signal and said sample signal is asserted before said reset signal is unasserted.

11. A method of claim 10, wherein said sample signal is unasserted before said reset signal is unasserted.

12. A method comprising the steps of:

resetting a sensing node in a pixel by asserting a reset signal at a gate of a reset transistor at a level higher than a minimum voltage which causes the reset transistor to conduct and clamp the sensing node to a supply voltage; and sampling a reset value while reducing the supply voltage when the reset signal is asserted and the sensing node is clamped to the supply voltage.

13. The method of claim 12, wherein said reducing the supply voltage comprises reducing the supply voltage by a threshold voltage of the reset transistor.

14. A method comprising:

resetting a sensing node in a pixel by asserting a reset signal at a gate of a reset transistor at a level higher than a minimum voltage which causes the reset transistor to conduct and clamp the sensing node to a supply voltage to reset a photodetector in a freeze-frame shutter Active Pixel Sensor (APS) device; and sampling a reset value while the reset signal is asserted and the sensing node is clamped to the supply voltage.

15. The method of claim 14, wherein said Active Pixel Sensor (APS) device includes a memory capacitor.

16. A method for reducing kTC noise in a Complemenary Metal Oxide Semiconductor (CMOS) sensor device, the method comprising:

asserting a reset signal at a gate of a reset transistor at a voltage greater than a reference voltage, wherein the reference voltage is a minimum voltage which causes the reset transistor to conduct and clamp a pixel to a supply voltage; and reading a reset value for said pixel in the sensor while a sensing node in the pixel is clamped to said supply voltage.

17. The method of claim 16, wherein said supply voltage comprises a constant voltage.

18. The method of claim 16, further comprising filtering high frequency kTC noise in the reset signal through a low bandwidth filter.

19. The method of claim 16, wherein said reducing noise comprises reducing kTC noise in an Active Pixel Sensor (APS) CMOS sensor device.

20. A method of claim 16, wherein said reading is response to a sample signal and said sample signal is asserted before said reset signal is unasserted.

21. A method of claim 20, wherein said sample signal is unasserted before said reset signal is unasserted.

* * * * *